L. S. CHICHESTER.
Preparing Cereals for Food.
No. 153,240. Patented July 21, 1874.
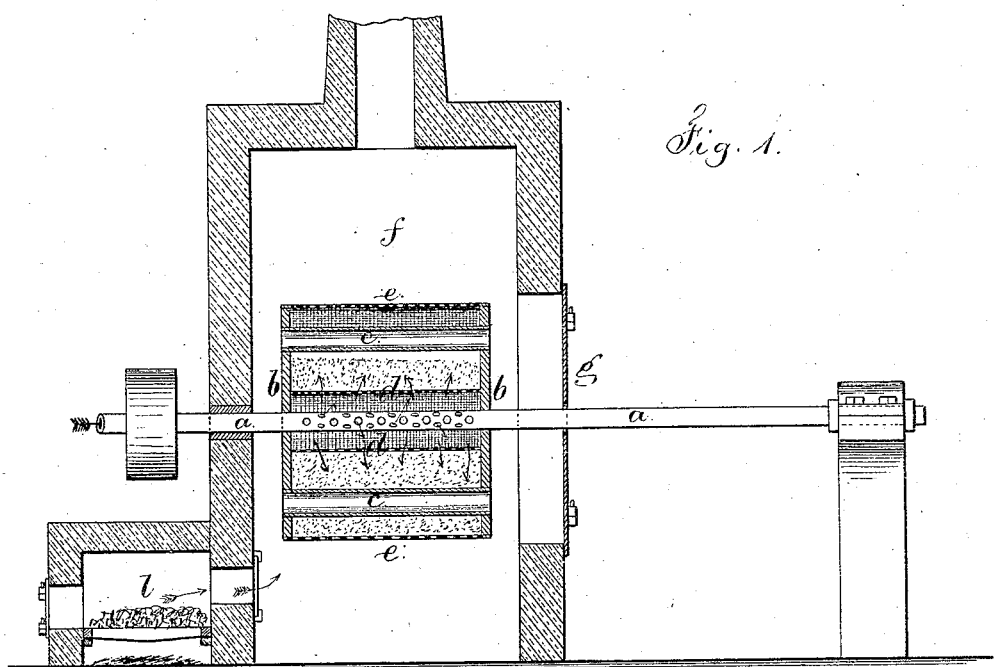
Fig. 1.
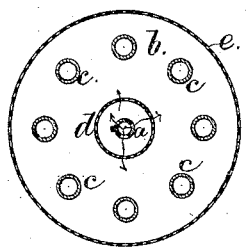
Fig. 2.
Witnesses
Inventor
Lewis S. Chichester
per Lemuel W. Serrell
atty.

UNITED STATES PATENT OFFICE.

LEWIS S. CHICHESTER, OF BROOKLYN, NEW YORK.

IMPROVEMENT IN PREPARING CEREALS FOR FOOD.

Specification forming part of Letters Patent No. 153,240, dated July 21, 1874; application filed December 13, 1873.

*To all whom it may concern:*

Be it known that I, LEWIS S. CHICHESTER, of Brooklyn, in the county of Kings and State of New York, have invented an Improvement in Preparing Cereals for Use, of which the following is a specification:

In Letters Patent Nos. 136,305 and 144,508, heretofore granted to me, modes of preparing cereals for use are set forth, the same relating to mixing with water, kneading, and baking either in a granulated state or in thin layers or pieces. In this method there is a risk of the flavor being injured by browning the meal too much, besides the labor of mixing, and the risk of unequal cooking.

I make use of a cylinder of wire-cloth or perforated metal, fitted to be revolved upon a steam-pipe, and through this cylinder tubes pass, and the cylinder is inclosed in a heating-chamber. The cereal to be treated is introduced into this cylinder through an opening, which is afterward closed. Moist steam is introduced sufficient to moisten the cereal and cook the same by an operation similar to boiling, the revolution of the cylinder causing the contents to be thoroughly mixed, and uniformly acted upon. The temperature of the chamber is also sufficient to promote a thorough cooking operation, and the mass is dried either by shutting off the steam after the mass is cooked and continuing the heat of the chamber, or, preferably, by increasing the temperature of the steam by superheating it previous to shutting it off.

In the drawing I have shown in Figure 1 a vertical section of the apparatus adapted to my mode of preparing cereals, and in Fig. 2 a cross-section is shown of the cylinder.

The pipe $a$ is mounted so as to be revolved, and upon it are the heads $b\ b$, connected by the tubes $c$, and provided with an inner cylinder, $d$, of gauze, and an outer perforated case, $e$, in which is an opening with a suitable cover, the whole forming a circular case that can be slid out of the oven $f$ when the doors $g$ are open, and discharged and refilled and then passed back into the oven, and steam admitted into the middle through perforations in the pipe $a$, and while the steam is acting upon the meal in this case the case should be revolved slowly to allow all parts to be equally moistened and heated. After the steam has acted upon the meal the required length of time the temperature of the steam may be increased by superheating, and after the steam is shut off the heat from the fire at $l$ should be sufficient to warm the oven and thoroughly dry the cooked meal, after which it is removed by slipping the case endwise upon the pipe $a$ and opening the doors $g$.

During the entire operation it is preferable to revolve the case, in order that the mass may be kept loose and open by falling against the tubes $c$, and this agitation insures uniformity of treatment. The tubes $c$ should be open at both ends to allow the heat to pass into them and aid in the drying operation.

If desired, the meal may be ground after treatment.

Flour prepared in above manner will remain unchanged for a great length of time, and musty flour or grain can be renovated and greatly improved.

The meal by this plan is prepared and complete for sale in a cooked condition; and, hence, when made up in any of the ordinary articles of food to which it may be adapted, requires but little more cooking, thus effecting a great saving of time, and preventing injury to the cereal by climatic influences, and all animalculæ or germ is killed, if any exists in the cereal.

I do not claim a closed cylinder revolved upon a hollow shaft, and containing an inner perforated cylinder, as the same is not adapted to the drying operation that is necessary after cooking the meal by the action of steam.

I claim as my invention—

1. A perforated cylinder, provided with heads $b$, connected by tubes $c$, and mounted upon a hollow shaft, through which steam is admitted to such cylinder, and an oven or heated chamber, within which such cylinder is revolved, substantially as set forth, for cooking ground or crushed cereals by the action of steam, and then drying the same, as set forth.

2. The method herein described of preparing cereals, consisting, first, of crushing or grinding; second, of cooking by the direct application of the moisture and heat of steam while agitated to insure uniformity, and to prevent the mass caking; and, third, of drying to prepare the material for packing, as set forth.

Signed by me this 10th day of December, A. D. 1873.

LEWIS S. CHICHESTER.

Witnesses:
 GEO. T. PINCKNEY,
 CHAS. H. SMITH.